Feb. 26, 1946. J. R. ALBERS ET AL Re. 22,726

GOVERNOR FOR WIND DRIVEN PROPELLERS

Original Filed Feb. 26, 1936

INVENTORS:
JOHN R. ALBERS
GERHARD H. ALBERS
BY David M. Davis
THEIR ATTORNEY

Reissued Feb. 26, 1946 Re. 22,726

UNITED STATES PATENT OFFICE 22,726

GOVERNOR FOR WIND DRIVEN PROPELLERS

John R. Albers and Gerhard H. Albers, Sioux City, Iowa, assignors to Wincharger Corporation, Sioux City, Iowa, a corporation of Minnesota Original No. 2,277,011, dated March 17, 1942, Serial No. 65,834, February 26, 1936. Application for reissue January 15, 1944, Serial No. 518,432

8 Claims. (Cl. 170—75)

Our invention relates to a governor for propellers of the type for charging batteries, etc.

An object of our invention is to provide a governor which is readily attachable to a wind driven propeller of any standard type.

A further object of our invention is to provide an improved governor which will accurately govern the speed of such propellers so that the speed will not become too great.

A further object of our invention is to provide a governor having features for utilizing the governing action by natural forces with a minimum number of movable parts.

A further object of our invention is to provide a governing device in which a pair of centrifugally urged flaps are adapted to present their broadened surfaces in the line of travel of the propellers so as to cause a turbulent effect wherein centrifugally urged wind or air forces will be located in the path of travel of the propeller blades, thereby causing an abnormal condition wherein the normal wind forces striking against the propellers are disrupted to correspondingly cause a loss of efficiency in the rotating blades to provide a governing effect.

A further object of our invention is to provide such a governor which is simple in construction and can be manufactured at a very reasonable cost.

Figure 1:
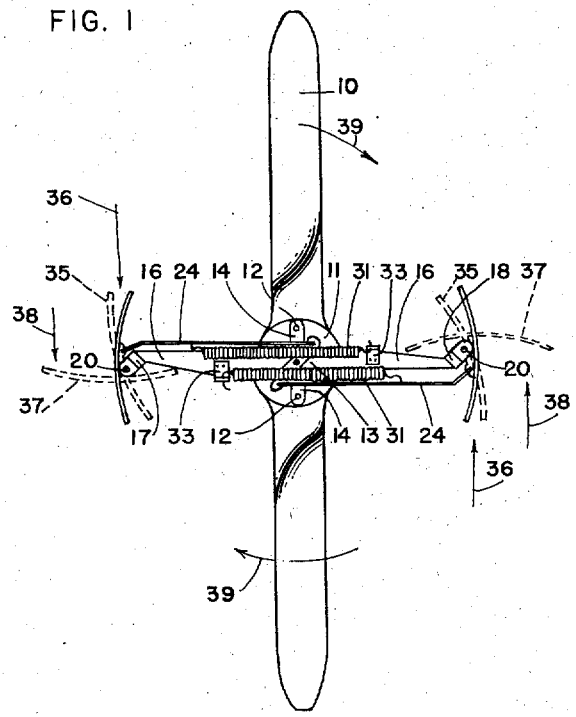
Figure 2:
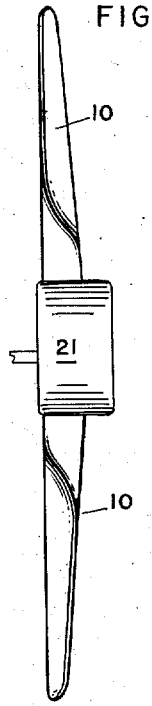
Figure 3:
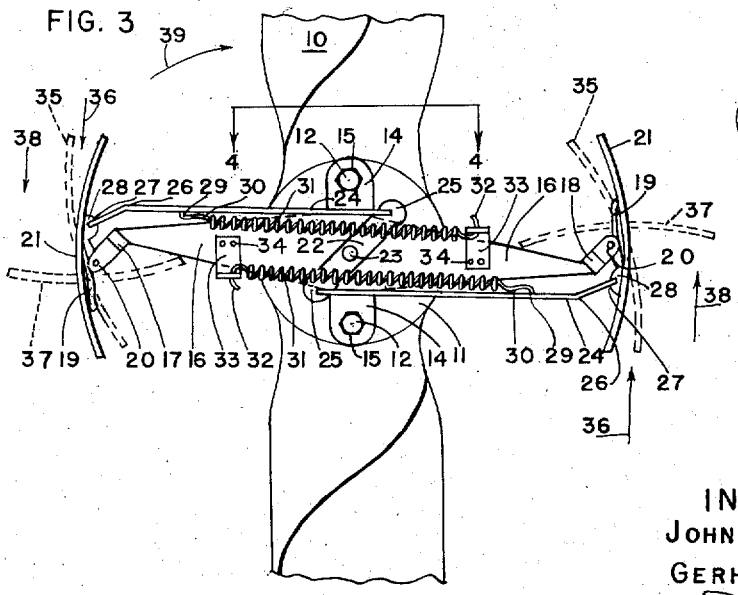
Figure 4:
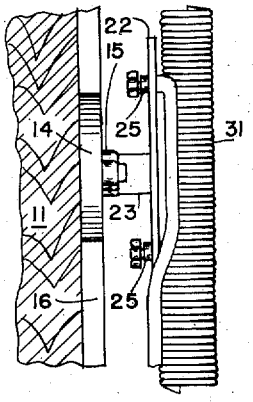

The features of our invention which we believe to be novel are set forth with particularity in the appended claims. Our invention itself, both as to its organization and manner of operation, together with further objects and advantages thereof, may best be understood by reference to the following description taken in connection with the accompanying drawing in which:

Figure 1 is a front elevation of the governor attached to a standard wind driven propeller, Figure 2 is a side view of Figure 1, Figure 3 is an enlarged detail in elevation of the governor, and Figure 4 is an enlarged detail taken generally along the lines 4—4 of Figure 3.

The principal problem encountered in generator plants for farm uses, etc., is that of accurately governing the speed of the wind propeller which drives the generator. If the speed becomes too great, it will result in overcharging and the like with its attendant injurious results. It is an object of our invention to provide a governor which can be easily attached to such propellers which will accurately govern the maximum speed of the same. To attain this end we use the principles of centrifugal force and wind resistance in a structure which will now be explained.

We have used the numeral 10 to designate the wind driven propeller or prime mover which can be made of any suitable form usable in the art, and preferably made from wood with radial blades. The hub of the propeller is indicated by the numeral 11 and includes the two threaded studs 12. We provide the metal casting 13 having the projecting ears 14 which include suitable openings through which the studs 12 pass, and which ears are then locked by means of nuts 15. The casting 13 extends into the two integral arms 16. It will be noted that the arms 16 are generally at right angles to the longitudinal vertical axis of the propeller. The left hand arm 16, as shown in the drawing, includes the downwardly bent fork member 17, and the right hand arm, the upwardly bent fork member 18. These members receive the members 19 which are pivotally pinned at 20 to turn about an axis substantially parallel to the axis of prime mover 10. The members 19 are attached firmly to the arcuate air resisting plates 21. The plates 21 are of a fairly substantial length and width, the proportionate width being shown more clearly in Figure 2, and have surfaces large enough to produce a substantial amount of air resistance or turbulence.

A further member 22 rocks pivotally upon the extending center stud 23, and includes openings at each end, which openings receive the extremities of the rods 24 at 25. The rods 24 are slightly bent at 26 and are pivotally received at 27 in openings in the ears 28, which ears are integral extensions of the members 19. Attached at 29 to both rods are the ends 30 of the tension springs 31. The other end of the springs 31 are attached at 32 to the upwardly bent members 33 which are suitably attached at 34 to the arms 16.

The arcuate plates 21 are so shaped and positioned that the curvature thereof is a true circle and they lie normally in a circle whose center is at the center of the propeller. In other words, during normal rotation and when the plates are not deflected, they revolve directly in the path of rotation of the propeller in the space swept through thereby without encountering any substantial opposing wind resistance. That is, the plates 21 are normally held in positions with respect to prime mover 10 so that they lie in a plane substantially parallel to the direction of motion of those plates. The tension in the springs will maintain only a certain resistance, and it will be noted that the pivoting points 20 of the arcuate plates 21 are off of the true horizontal center, therefore, after the speed has been built up over a certain point, the centrifugal force of the plates 21 and the rods 24 will tend to throw the plates to the position as shown by the dotted lines at 35. As soon as the plates have been thrown out of the true circle of rotation which they are normally in, there will be wind effects opposing the plates as indicated by the arrows 36. As the speed is built up to a substantially greater degree than that necessary, the plates will furthermore take their maximum position as shown in the dotted structure at 37 wherein the opposing forces at 38 will be considerably greater. Since such opposing forces are directly opposite to the direction of rotation of the propeller in a recurrent path as indicated by the arrows 39, the result will be to retard the speed of rotation of the propeller, and it will be slowed up thereby, and the size of the plates 21 together with the tension of the springs 31 are so adjusted to maintain the propeller at a certain maximum speed without exceeding this limit. In other words, the tendency of the combined forces is such as to maintain a certain constant maximum speed under any conditions by virtue of the braking action of the plates.

It will be noted that the attachment of the rods 24 to the tension springs 31 and especially to the pivotally mounted member 22 at 25, provides the feature of insuring the same deflection for both plates, so that one plate will not be deflected more than another in the case of a weaker spring.

A further important action which takes place in the use of this governing device is as follows: During rotation of the entire device, and as explained heretofore, the flaps 21 will be centrifugally urged upon corresponding speed to the dotted position shown in Figure 3, and in this position a further action will take place other than the braking action. When in this position, the effect of the flaps is to cause a substantially large volume of air to be impelled radially and centrifugally therefrom and outwardly in an annular formation, or in a plane in which the impeller blades 10 rotate. Also, these wind forces or disturbances will occupy a cylinder either the width of the flaps or substantially greater. Naturally, the amount of air impelled outwardly will be proportionate to the amount of deflection of the flaps from their normal position to their position of greatest resistance so that, as a result, the faster the structure rotates, the greater is the effect and extent. If the propeller were running in a normal medium, that is, in a smooth wind stream unaffected by turbulence, there would be no effect of this spoilage, or the effect caused by the turbulence of the air forces, and the propeller could, in the absence of these flaps, rotate at a considerably higher speed than that desired. However, by virtue of this description, it will be clearly seen that, since the blades will not be rotating in the natural medium caused by the wind forces thereon, they will slow down under such conditions since the normal forces of the wind will be disrupted and disarranged by turbulence produced by plates 21 in the recurrent path traversed by blades 10 to such an extent that the governing function will take place. In other words, the radial and other wind forces thus set up artificially will produce a resultant force along the blade which will slow it down to a material degree. When the flaps are in their normal position, or when they are not deflected outwardly, there will be substantially no disrupting or spoilage effect, since the surface presented against the wind forces is at an absolute minimum, and the spoiling effect will, correspondingly, gradually increase radially, proportionately to the deflection of the flaps away from such normal position.

It will now be seen that we have provided a governor for wind driven propellers which efficiently utilizes natural forces in suitably governing the speed of such propellers, that the governor is readily attachable, and can be manufactured at a very reasonable cost.

While we have shown and described the particular embodiments of our invention, it will be obvious to those skilled in the art that changes and modifications may be made without departing from our invention in its broader aspects, and we, therefore, aim in the appended claims to cover all such changes and modifications as fall within the true spirit and scope of our invention.

We claim as our invention:

1. In a rotating wind driven structure a propeller blade supported to rotate about an axis, an arm secured to turn with and be driven by said blade and extending from the axis thereof, a plate pivotally attached to the free-end-part of said arm, and spring resisting means acting upon said plate as it is swung by centrifugal force upon its pivotal attachment to said arm to offer opposing wind effects to the rotation of said blade, the pivotal axis of the plate being positioned at right angles to the plane of rotation of the propeller, and said pivotal axis being positioned off the horizontal center of the plate, said plate in its various positions operating to govern the speed of said propeller blade.

2. In a rotating wind driven structure, a plurality of radially extending propeller blades, a shaft attached to said blades about which said blades rotate, an arm attached at the central junction of said blades and extending radially therefrom and transversely thereto, a pair of plates pivotally attached at the ends of said arm, the pivoting axes of said plates being at right angles to the plane of rotation of the propellers, and said pivotal axes being positioned off the horizontal centers of the plates, spring means for normally holding said plates in inoperative position, said plates adapted to be deflected out of the path of rotation thereof by centrifugal force applied against said spring means during rotation of the propeller, means for causing an equal deflection of said plates including a cross member pivotally mounted on the propeller shaft end, connecting rods attached at the ends of said cross member and to said plates, said spring means being attached to said rods.

3. In a rotating wind driven structure a plurality of propeller blades supported to rotate about an axis, a plurality of arcuate plates, arms extending radially from the axis of said propellers to which said plates are pivoted, the pivotal axes of said plates being positioned at right angles to the plane of rotation of said propellers, and said pivotal axes being positioned off the horizontal centers of the plates, tension means cooperant with said plates and resistant to the pivoting of the same by centrifugal action caused by the rotation of the propeller, said plates normally rotating in their circle of rotation, means for equalizing the deflection of said plates from normal position, including a cross member pivotally mounted on the propeller axis, rods attached to the ends of said cross member and to said plates, said plates in their various positions operating to govern the speed of said propeller blades.

4. In a rotating wind driven structure a plurality of propeller blades supported to rotate about an axis, arms secured to turn with and be driven by said blades and positioned substantially at right angles thereto, plates pivotally attached at the extremities of said arms, spring resisting means acting upon said plates as they are swung by centrifugal force upon their pivotal attachments to said arm to offer opposing wind forces to the rotation of said blades, the pivotal axes of the plates being positioned at right angles to the plane of rotation of the propellers, and said pivotal axes being positioned off the horizontal centers of the plates, said plates in their various positions operating to govern the speed of said propeller blades.

5. In a rotating wind driven structure a plurality of propeller blades supported to rotate about an axis, arms secured to turn with and be driven by said blades and positioned substantially at right angles thereto, plates pivotally attached at the extremities of said arms, and spring resisting means acting upon said plates as they are swung by centrifugal force upon their pivotal attachments to said arm to offer opposing wind effects to the rotation of said blades, the pivotal axes of the plates being positioned at right angles to the plane of rotation of the propellers, and said pivotal axes being positioned off the horizontal centers of the plates, said plates adapted to rotate in a circle within the tip circle of the propeller blades, said plates in their various positions operating to govern the speed of said propeller blades.

6. In a rotating wind driven structure, a plurality of radially extending propeller blades, a shaft attached to said blades about which said blades rotate, an arm attached at the central junction of said blades and extending radially therefrom and tranversely thereto, a pair of plates pivotally attached at the ends of said arm, the pivoting axes of said plates being at right angles to the plane of rotation of the propellers, spring means for normally holding said plates in inoperative position, said plates adapted to be deflected out of the path of rotation thereof by centrifugal force applied against said spring means during rotation of the propeller, means for causing an equal deflection of said plates including a cross member pivotally mounted on the propeller shaft end, connecting rods attached at the ends of said cross member and to said plates, said spring means being attached to said rods, the weight of said connecting rods providing said centrifugal force as said rods are rotated.

7. In a rotating wind driven structure, a plurality of radially extending propeller blades, a shaft attached to said blades about which said blades rotate, an arm attached at the central junction of said blades and extending radially therefrom and transversely thereto, a pair of plates pivotally attached at the ends of said arm, the pivoting axes of said plates being at right angles to the plane of rotation of the propellers, spring means for normally holding said plates in inoperative position, said plates being adapted to be deflected out of the path of rotation thereof by centrifugal force applied against said spring means during rotation of the propeller, means for causing an equal deflection of said plates including a cross-member pivotally mounted on the propeller shaft axis, connecting rods attached at the ends of said cross-member and to said plates said spring means being attached to said rods, the weight of said connecting rods providing said centrifugal force as said rods are rotated, said plates in their deflected positions presenting increased wind resistance to rotation of said structure.

8. In a rotating wind driven structure, a shaft adapted for rotation about its axis, two propeller blades, each attached at one end to said shaft to form a hub, said blades being mounted in line with each other on opposite sides of said shaft and extending radially therefrom and means to improve the gyroscopic balance of said structure and to govern the speed thereof comprising an arm attached to said hub midway between the ends of the arm with the two parts of said arm on either side of said point of attachment extending radially from said shaft and at right angles to the line of said blades, a plate pivotally mounted on each part of said arm with its pivotal axis adjacent the end of the arm and parallel to the axis of said shaft, a member pivotally mounted on said hub with its axis coincident with the shaft axis, a connecting rod connected between each plate and said member at points removed from their respective pivotal axes, said member and connecting rods operating to maintain said plates at all times in like positions with respect to the axis of said shaft, spring means biasing said plates to a position in which they are inoperative to cause any substantial braking of said structure, and centrifugal force means including said rods to move said plates away from inoperative position at speed of rotation of said blades above a predetermined speed.

JOHN R. ALBERS.
GERHARD H. ALBERS.